United States Patent [19]

Umemura et al.

[11] 4,225,462
[45] Sep. 30, 1980

[54] CATALYST FOR REDUCING NITROGEN OXIDES AND PROCESS FOR PRODUCING THE SAME

[75] Inventors: Sumio Umemura; Ryozo Kitoh; Shigeru Itoh; Yasutaka Arima, all of Ube; Kosuke Itoh, Yamaguchi; Hideaki Fukui, Ube, all of Japan

[73] Assignee: Ube Industries, Ltd., Yamaguchi, Japan

[21] Appl. No.: 941,929

[22] Filed: Sep. 13, 1978

[30] Foreign Application Priority Data

Sep. 30, 1977 [JP] Japan .................. 52-116689

[51] Int. Cl.³ .......................... B01J 27/02; B01J 8/02; B01J 8/00
[52] U.S. Cl. .................. 252/440; 423/213.2; 423/239
[58] Field of Search ........................ 252/440

[56] References Cited

U.S. PATENT DOCUMENTS

| 1,675,308 | 6/1928 | Jaeger | 423/535 X |
| 1,741,310 | 12/1929 | Jaeger | 423/535 X |
| 3,523,964 | 8/1970 | Kober et al. | 252/440 X |
| 3,544,534 | 12/1970 | Kadawaki et al. | 252/440 X |
| 4,152,296 | 5/1979 | Okobe | 252/440 |

FOREIGN PATENT DOCUMENTS 50-6591 of 1975 Japan .
51-103869 of 1976 Japan .
51-21567 of 1976 Japan .
51-22691 of 1976 Japan .

*Primary Examiner*—Delbert E. Gantz
*Assistant Examiner*—William G. Wright
*Attorney, Agent, or Firm*—Burgess, Ryan and Wayne

[57] ABSTRACT

Disclosed is a water resistant catalyst for reducing nitrogen oxides with ammonia, which catalyst comprises barium sulfate and vanadium(IV)oxide sulfate which has peaks at 940 cm$^{-1}$ and 510 cm$^{-1}$ in an infrared absorption spectrum.

14 Claims, No Drawings

CATALYST FOR REDUCING NITROGEN OXIDES AND PROCESS FOR PRODUCING THE SAME

The present invention relates to a catalyst for reducing nitrogen oxides with ammonia. More particularly, the present invention relates to a catalyst for reducing nitrogen oxide with ammonia, which catalyst is water resistant and has an excellent catalytic activity even at a low temperature.

It is known that nitrogen oxides ($NO_x$), including nitrogen monoxide (NO) and nitrogen dioxide ($NO_2$), which are container is exhaust gases from internal combustion engines, steam-power plants, boilers, burning apparatuses in various factories, iron-producing factories, etc, can be removed from the exhaust gases by reducing them with ammonia in the presence of a catalyst, in accordance with the following reactions.

$$4NO + 4NH_3 + O_2 \rightarrow 6H_2O + 4N_2$$

$$6NO + 4NH_3 \rightarrow 5N_2 + 6H_2O$$

and $$6NO_2 + 8NH_3 \rightarrow 7N_2 + 12H_2O$$

The exhaust gases sometime contain sulphur oxides ($SO_x$), for example, sulphur dioxide ($SO_2$) and sulphur trioxide ($SO_3$). For the purpose of reducing the nitrogen oxides with ammonia, various types of catalysts are also known, for example, in Japanese patent Applications Laying-open (KOKAI) Nos. 50-6591, 51-21567, 51-22691 and 51-103869.

A typical type of catalyst for reducing nitrogen oxides with ammonia, comprises, as catalytic active components, oxides of iron, copper and vanadium carried on a carrier consisting of, for example, alumina and titania. Among the above-mentioned types of catalysts, a $V_2O_5$-$TiO_2$ type catalyst is known to be advantageous in its high catalytic activity at a relatively low temperature (about 300° C.) and high resistance to $SO_x$. However, this type of catalyst is also known to be disadvantageous in that, due to its high activity for oxidizing $SO_x$, a large amount of $SO_3$ is produced on the outer surface of the catalyst, the resultant $SO_3$ reacts with ammonia which is used as a reducing agent for the nitrogen oxides, and the reaction products such as ammonium salts of sulphur-containing acids, for example, ammonium hydrogen sulfate, are deposited on the outer surfaces of the catalyst, heat-exchanger and chimney of the burning apparatuses. The above-mentioned deposit of the reaction products of $SO_3$ with ammonia reduces the catalytic activity of the catalyst and corrodes the apparatuses. The corrosion and reduction in catalytic activity makes operation of the process difficult and causes the amount of $NO_x$ in the exhaust gases to increase as the process is operated over a period of time.

Also, various types of catalysts for reducing the nitrogen oxide with ammonia, containing, as a catalytically active component, a metal sulfate for example, vanadyl sulfate, are known. These types of catalysts are advantageous in resistance to $SO_x$ and their durability. However, when the catalyst which has been contaminated with dust contained in the exhaust gas is washed with water to recover the catalyst, or is wetted with water during the reduction operation for the nitrogen oxides, a portion of the catalyst is dissolved away or destroyed by the water. Also, this type of catalyst is disadvantageous in its low catalytic activity at a low temperature (about 300° C.). Furthermore, the catalyst is unsatisfactory in its catalytic activity for reducing the nitrogen oxides with ammonia.

In the case where the catalyst in which the oxide or sulfate of vanadium is carried on a catalytic base consisting of, for example, alumina, the alumina is converted into aluminium sulfate by the action of $SO_x$ in the exhaust gas. This conversion results in low catalytic activity and low durability of the catalyst.

Japanese Patent Application Laying-open (KOKAI) No. 51-103869 discloses a large number of catalysts containing sulfates of various metals. The description on page 3, the left column, line 20 to the right column, line 6, of this laid-open application, states that the catalyst can be prepared without being calcined and the catalytically active components can be readily separated from the catalyst by washing the catalyst with water. This description shows that the catalytically active component has a poor resistance to water. Therefore, when the catalyst is washed with water to remove particulate matter, the catalyst is sometimes destroyed or the catalytically active component is dissolved away by the water. Also, in the case where the catalyst has been used for reducing the $NO_x$ in a dirty exhaust gas containing a large amount of dust, it is difficult to separate the catalytic active component from the dust deposited on the catalyst even by washing the catalyst with water to dissolve the catalytic active component. Furthermore, the catalyst is disadvantageous in its low catalytic activity at a low temperature.

Under these circumstances, it is desirable to provide a new type of catalyst having the following advantageous properties.

1. Low catalytic activity for of oxidizing $SO_2$ in the exhaust gas to $SO_3$.
2. High resistance to $SO_x$ and high durability in catalytic activity over a long period of time, even in an exhaust gas containing a high concentration of $SO_x$.
3. High resistance to water, that is, high insolubility in water. Accordingly, even when the catalyst is brought into contact with water, no component is dissolved in water and the form of the catalyst can be maintained without being destroyed.
4. High catalytic activity at a low temperature of about 300° C.

An object of the present invention is to provide a catalyst for reducing nitrogen oxides with ammonia, which catalyst has a high resistance to water and a high catalytic activity even at a low temperature, and a process for producing the same.

Another object of the present invention is to provide a catalyst for reducing nitrogen oxides with ammonia, the catalyst having a high resistance to $SO_x$ and low catalytic activity for oxidizing $SO_2$, and a process for producing the same.

The above-mentioned objects can be attained by the catalyst of the present invention which comprises barium sulfate and water-insoluble vanadyl sulfate.

The water-insoluble vanadyl sulfate is definitely distinguished from conventional water-soluble vanadyl sulfate. That is, the water-insoluble vanadyl sulfate has peaks at 940 cm$^{-1}$ and 510 cm$^{-1}$ in an infrared absorption spectrum while a peak is found neither at 940 cm$^{-1}$ nor 510 cm$^{-1}$ in the infrared absorption spectrum of the water-soluble vanadyl sulfate. The water-insoluble vanadyl sulfate has the same X-ray diffraction image as that mentioned in ASTM 19-1400 or, in other words, it is vanadium (IV) oxide sulfate.

During the inventor's study, it was found that the above-mentioned objects could be attained by using a catalyst which had been produced by mixing barium sulfate and sulfuric acid or an ammonium sulfate compound, for example, ammonium hydrogen sulfate, ammonium sulfite, ammonium sulfate or ammonium persulfate, with a solution of a vanadyl compound which had been prepared by dissolving a vanadium compound in an aqueous solution of a reducing agent, for example, oxalic acid, to reduce the valence of vanadium to a value less than 5, and; by drying and calcining the mixture. Furthermore, as a result of the inventor's additional study, it was found that the above-obtained vanadium (IV) oxide sulfate is insoluble in water, while the conventional vanadium (IV) oxide sulfate is soluble in water, and the water-insoluble vanadium (IV) oxide sulfate can be definitely distinguished from the water-soluble vanadium (IV) oxide sulfate when their X-ray diffraction spectrums and infrared absorption spectrum are compared. It was also found that the above-mentioned objects could be attained by using a catalyst which has been prepared by mixing barium sulfate with water-soluble vanadium (IV) oxide sulfate together with water, and by drying and calcining the mixture.

The Inventor has also found that a catalyst which has been prepared in accordance with a process of Japanese Patent Application Laying-open (KOKAI) No. 51-103869, by mixing, together with a small amount of water, cobalt sulfate, water-soluble vanadyl sulfate or ferrous sulfate with barium sulfate, calcium sulfate, strontium sulfate or lead sulfate, and by drying and calcining the mixture, has a low catalytic activity at a low temperature and is disadvantageous in that the catalytic components are soluble in water. Further, the Inventor has found that a catalyst which has been produced by mixing or impregnating a catalytic base, for example, alumina or silica, with water-soluble vanadyl sulfate alone, and by drying and calcining the mixture, has a high activity for oxidizing $SO_2$ into $SO_3$. That is, this type of catalyst can not attain the objects of the present invention.

Additionally, it was found that, even when ammonium metavanadate is dissolved in an aqueous solution of oxalic acid and ammonium sulfate is added to the solution, the resultant solution is mixed with calcium sulfate or strontium sulfate in place of barium sulfate, and the admixture is dried and calcined to provide a catalyst, the vanadium compound can not be thoroughly converted into the water-insoluble vanadium (IV) oxide sulfate and the resultant catalyst has a poor catalytic activity at a low temperature.

From the results of the inventor's study, it is evident that it is essential that the water-insoluble vanadium (IV) oxide sulfate is mixed with the barium sulfate in the catalyst of the present invention. Furthermore, the barium sulfate can not be replaced by another sulfate, for example, calcium sulfate or strontium sulfate. In addition, the lack of either the water-insoluble vanadium (IV) oxide sulfate or barium sulfate results in a poor catalyst which can not attain the objects of the present invention.

The proportions of the vanadium (IV) oxide sulfate and barium sulfate in the catalyst is not limited to a special range. However, it is preferable that the catalyst contain 1 to 35% by weight, more preferably 5 to 30% by weight, of the vanadium (IV) oxide sulfate and 65 to 99% by weight, more preferably of 70 to 95% by weight, of barium sulfate. Also, it is preferable that the entire amount of the vanadyl compound in the catalyst be in the state of water-insoluble vanadium (IV) oxide sulfate. However, one or more vanadium compounds which are different from the vanadium (IV) oxide sulfate may be contained in an amount of 5% or less, based on the entire weight of the vanadium compounds in the catalyst.

The catalyst of the present invention can be produced by a process which comprises:

mixing water with barium sulfate and vanadium (IV) oxide sulfate which has been prepared by boiling a mixture of a vanadium oxide and concentrated sulfuric acid;

drying the resultant mixture, and;

calcining the dried mixture at a temperature of from 200° to 450° C. in an oxygen-containing atmosphere.

The vanadium (IV) oxide sulfate prepared in accordance with the above-mentioned process has a green color. The drying operation is carried out preferably at a temperature of from 90° to 150° C., and the calcining operation is carried out preferably at a temperature of from 200° to 450° C., more preferably, from 250° to 400° C. The oxygen-containing atmosphere may be atmospheric air. The atmosphere can contain sulfurous acid gas, ammonia gas or a mixture of the above-mentioned gas. The calcining operation is usually continued for 1 to 24 hours, preferably, 3 to 16 hours. The resultant catalyst has a bluish green color.

Also, the catalyst of the present invention can be produced by another process, which comprises:

mixing an aqueous solution of a vanadium compound in which vanadium has a valence less than 5 and which has been prepared by dissolving a vanadium compound in an aqueous solution of a reducing substance, sulfuric acid or an ammonium salt of a sulphur-oxygen acid and barium sulfate all together;

drying the resultant mixture, and;

calcining the dried mixture at a temperature of from 200° to 450° C. in an oxygen-containing atmosphere.

In the above-mentioned process, the vanadium compound to be dissolved in the aqueous solution of a reducing substance, may be vanadium pentoxide or ammonium metavanadate. The reducing substance is not limited to a special type of substance as long as the substance can reduce the valence of vanadium to a value less than 5. However, the reducing substance is usually selected from reducing organic carboxylic acids, for example, oxalic acid, citric acid and tartaric acid. The ammonium salts of sulphur-oxygen acid may be selected form the group consisting of ammonium hydrogen sulfate, ammonium sulfite, ammonium sulfate and ammonium persulfate. The most preferable ammonium salt is ammonium sulfate. When an ammonium salt of sulphur-oxygen acid other than ammonium sulfate or sulfuric acid is used, there is a tendency to form a small amount of vanadium pentoxide in the catalyst during the calcining process. The formation of the vanadium pentoxide might result in degradation in the catalytic activity of the resultant catalyst and in an increase in the activity of the resultant catalyst for oxidizing $SO_2$. In order to avoid the above-mentioned disadvantages due to the formation of the vanadium pentoxide, it is preferable that the sintering operation be carried out in the oxygen-containing atmosphere which additionally contains ammonia gas. This ammonia gas-containing calcining atmosphere is effective for preventing the formation of vanadium pentoxide and for insuring the conversion of the vanadium compound into the vanadium (IV) oxide sulfate. The order in which the vanadium solution, sulfuric acid or the ammonium salt of sulphur-oxygen acid and barium sulfate are mixed, is not limited to a special order. For example, first, the barium sulfate can be mixed with sulfuric acid or the ammonium salt of sulphur-oxygen acid together with a small amount of water, and then, the vanadium solution can be mixed with the mixture. Another order would be that, first, barium sulfate is mixed with the vanadium solution and, then, the mixture is mixed with sulfuric acid or an ammonium salt of the sulphur-oxygen acid. Also the vanadium solution can first be mixed with sulfuric acid or an ammonium salt of a sulphur-oxygen acid and, then, the mixture can be admixed with barium sulfate. Furthermore, the above-mentioned three components can be mixed all together at once. The sulfuric acid or the ammonium salt of sulphur-oxygen acid is preferably used in a ratio in atoms of sulphur to vanadium of from 1 to 2. Even if the ratio is more than 2, no additional effect can be expected. The drying operation is carried out preferably at a temperature of from 90° to 150° C. Next, the calcining operation is carried out at a temperature of from 200° to 450° C., preferably, from 250° to 400° C. for preferably from 1 to 24 hours, more preferably, from 3 to 16 hours. The oxygen-containing atmosphere may be atmospheric air. The atmosphere preferably contains ammonia gas, more preferably a mixture of ammonia gas and sulfurous acid gas. This atmosphere can thoroughly maintain the vanadium (IV) oxide sulfate in the water-insoluble state during the calcining operation. The calcining operation results in the formation of the catalyst of the present invention consisting of barium sulfate and the vanadium (IV) oxide sulfate.

The catalyst of the present invention can be produced by another process, which comprises:
providing a mixture of water with barium sulfate and water-soluble vanadyl sulfate;
drying the resultant mixture, and;
calcining the dried mixture at a temperature of from 250° to 450° C. in an atmosphere containing sulfurous acid gas and ammonia gas.

In this process, the mixture can be prepared by mixing barium sulfate and the water-soluble vanadyl sulfate together with a small amount of water, or by impregnating a shaped barium sulfate material with an aqueous solution of the water-soluble vanadyl sulfate. The drying operation may be carried out at a temperature of from 90° to 150° C. The calcining operation is carried out at a temperature of from 250° to 450° C., preferably, from 300° to 400° C., for, preferably, from 1 to 24 hours, more preferably, from 3 to 16 hours. The air atmosphere containing no sulfurous acid gas and ammonia gas is not suitable for this process.

The catalyst of the present invention can be produced by either one of the above-mentioned three processes. However, the most preferable process is the second process mentioned above. That is, using the process, barium sulfate and ammonium sulfate are mixed with an aqueous solution of reduced vanadium, which has been prepared by dissolving ammonium metavanadate in an aqueous solution of oxalic acid; the mixture is dried at a temperature of from 90° to 150° C., and; then, the dried mixture is calcined at a temperature of from 200° to 450° C., preferably, from 250° to 400° C., in an oxygen-containing atmosphere, preferably, an ammonia and sulfurous acid gas-containing atmosphere, for from 1 to 24 hours, preferably, from 3 to 16 hours. The resultant catalyst has a bluish green color is characterized by comprising vanadium in the state of vanadium (IV) oxide sulfate and barium sulfate uniformly mixed with the vanadyl sulfate.

The catalyst of the present invention has the advantages of:

(1) a higher catalytic activity for reducing nitrogen oxides at a relatively low temperature than that of conventional sulfate catalysts;

(2) a high resistance to $SO_x$ and, therefore is capable of maintaining its high catalytic activity over a long period of time, even when the exhaust gas to be treated contains a high concentration of $SO_x$;

(3) a high insolubility in water and, therefore, is capable of being recovered when the catalyst is contaminated with dust in an exhaust gas, by being washed with water, without dissolving away the catalytic active component and destroying the catalyst, and;

(4) substantially no catalytic activity for of oxidizing $SO_2$ at a low temperature of about 300° C. and, therefore, being capable of preventing the formation of undesirable ammonium salts, for example, ammonium hydrogen sulfate, on the outer surface of the catalyst, which salts cause the catalytic activity of the catalyst to be reduced.

Accordingly, the catalyst of the present invention is very effective for reducing nitrogen oxides in an exhaust gas, especially an exhaust gas containing $SO_x$ in addition to the nitrogen oxides.

The specific examples set forth below will serve to more fully explain the practice of the present invention. However, it should be understood that these examples should in no way be construed as defining limits of the present invention.

In each of the examples, the catalytic activity of the resultant catalyst for reducing $NO_x$ was tested by the following method.

The catalyst in the form of pellets was charged into a U-shaped reaction tube made of a stainless steel and having an inside diameter of 30 mm. The reaction tube was placed in a salt bath and maintained at a temperature of 300° C. or 360° C. A model gas consisting of 300 ppm of NO, 330 ppm of $NH_3$, 700 ppm of $SO_2$, 10% by volume of steam 5% by volume of $O_2$ and the balance consisting of $N_2$, was flowed through the reaction tube at a space velocity of 5000 $hr^{-1}$. After the above-mentioned operation was continued for 24 hours, the contents of $NO_x$ gas in the model gas at the inlet and the outlet end of the reaction tube were measured by a chemiluminescence type analytical apparatus for $NO_x$. The reduction percentage was calculated in accordance with the equation:

$$\text{Reduction (\%)} = \frac{X_1 - X_2}{X_1} \times 100$$

wherein $X_1$ and $X_2$ represent the content of $NO_x$ in the model gas at the inlet end and the outlet end of the reaction tube, respectively.

Also, the activity of the catalyst for oxidizing $SO_2$ was determined in the following method.

A U-shaped reaction tube having an inside diameter of 30 mm was packed with 20 ml of the catalyst and heated to a temperature of 250°, 300° or 350° C. A model gas consisting of 0.1% by volume of $SO_2$, 5% by volume of $O_2$ and the balance consisting of $N_2$ was flowed through the reaction tube at a space velocity of 5000 hr$^{-1}$. The content $Y_1$ of $SO_2$ in the model gas at the inlet end of the reaction tube and the content $Y_2$ of $SO_2$ in the model gas at the outlet end of the reaction tube were measured. The $SO_2$ oxidation activity of the catalyst was calculated in accordance with the equation:

$$SO_2 \text{ oxidation activity (\%)} = \frac{Y_1 - Y_2}{Y_1} \times 100$$

Furthermore, the resistance of a catalyst to water was determined as follows.

The catalyst was finely pulverized, and sieved by using a 100 mesh screen. 10 g of the pulverized catalyst which passed through the 100 mesh screen, were immersed in 50 ml of water for 4 hours. After filtering by using a glass filter, the water treated catalyst was dried together with the glass filter at a temperature of 110° C. for 24 hours. The weight (Z) of the dried catalyst was determined. The loss (%) in weight of the catalyst was calculated in accordance with the equation:

$$\text{Weight Loss (\%)} = \frac{10 - Z}{10} \times 100$$

EXAMPLES 1 TO 11

In Example 1, 15 g of vanadium (IV) oxide sulfate which has been prepared by boiling vanadium pentoxide in concentrated sulfuric acid, and 185 g of barium sulfate were kneaded together with a small amount of water. The resultant mixture was dried at a temperature of 110° C. and molded to form a number of pellets each having a diametr of 5 mm and a height of 4 mm. The pellets were calcined at a temperature of 300° C. for 5 hours in an air atmosphere. The resultant catalyst consisted of 7.5% by weight of the vanadium (IV) oxide sulfate and 92.5% by weight of barium sulfate. The catalyst had the catalytic activity for reducing $NO_x$ shown in Table 1.

Also the valence of vanadium in the catalyst was determined. The result is shown in Table 4 below. Furthermore, the $SO_2$ oxidation activity of the catalyst was determined. The result is also shown in Table 4 below.

In addition, the resistance of the catalyst to water was determined. As a result of the test, the weight loss was 0.03%. That is, the catalyst had a very high resistance to water.

In Example 2, 20 g of commercial water-soluble vanadyl sulfate ($VOSO_4.3H_2O$) which corresponds to 15 g of dehydrated vanadyl sulfate ($VOSO_4$), and 185 g of barium sulfate ($BaSO_4$) were thoroughly kneaded together with a small amount of water. The mixture was dried at a temperature of 110° C. and pelletized to form a number of pellets each having a diameter of 5 mm and a height of 4 mm. The pellets were calcined at a temperature of 380° C. in a gas atmosphere consisting of 0.1% by volume of $NH_3$, 0.1% by volume of $SO_2$ and the balance consisting of $N_2$ for 7 hours. The resultant catalyst was composed of 7.5% by weight of water-insoluble vanadyl sulfate and 92.5% by weight of barium sulfate. The results of the catalytic activity test are shown in Table 1.

Also, the valence of vanadium in the resultant catalyst and the $SO_2$ oxidation activity of the resultant catalyst were determined. The results are shown in Table 4 below.

In Example 3, 10.8 g of ammonium metavanadate were added to 150 ml of water and the resultant mixture was heated to a temperature of 80° C. 15 g of oxalic acid $(COOH)_2$ were gradually added to the resultant hot solution to reduce vanadium. 18 g of ammonium sulfate were added to the reduced vanadium solution and, then, 185 g of barium sulfate ($BaSO_4$) were mixed to the solution. The mixture was thoroughly kneaded to form a paste. The paste was dried at a temperature of 150° C. and the dried mixture was pelletized to provide a number of pellets each having a diameter of 5 mm and a height of 4 mm. The pellets were calcined at a temperature of 380° C. for 4 hours in air atmosphere. The resultant catalyst consisted of 7.5% by weight of water-insoluble vanadyl sulfate and 92.5% by weight of barium sulfate. The result of the catalytic activity test for the resultant catalyst are shown in Table 1.

Also, the valence of vanadium in the resultant catalyst and the $SO_2$ oxidation activity of the resultant catalyst were measured. The results are shown in Table 4 hereinafter.

Furthermore, the catalyst was subjected to a test for determining the resistance of the catalyst to water. As a result, the catalyst exhibited a very small weight loss of 0.06%.

In Example 4, procedures identical to those mentioned in Example 3 were carried out, except that, first the barium sulfate and the ammonium sulfate were kneaded together with a small amount of water and, then, an aqueous solution which has been prepared by dissolving the ammonium metavanadate in an aqueous solution of the oxalic acid, was added to the above-kneaded mixture. The resultant catalyst in the form of pellets had the same composition as that mentioned in Example 3. The catalytic activity of this catalyst is shown in Table 1.

In Example 5, procedures identical to those mentioned in Example 3 were carried out, except that, first, the barium sulfate was mixed with a reduced vanadium solution which had been prepared by dissolving the ammonium metavanadate in an aqueous solution of oxalic acid and, then, the ammonium sulfate was added to the above-prepared mixture. The resultant catalyst had the same composition as that mentioned in Example 3. The results of the catalytic activity test for this catalyst are shown in Table 1.

In Example 6, procedures identical to those mentioned in Example 3 were carried out, except that 13.6 g of concentrated sulfuric acid (98%) were used in place of the ammonium sulfate, and the pellets were calcined at a temperature of 400° C., for 4 hours, in a gas atmosphere consisting of 2% by volume of $NH_3$, 1% by volume of $O_2$ and the balance consisting of $N_2$. The resultant catalyst had the same composition as that mentioned in Example 3. The results of the catalytic activity test of this catalyst are shown in Table 1.

In Example 7, the same procedures as those mentioned in Example 3 were carried out, except that in place of the ammonium sulfate, 15.7 g of ammonium hydrogen sulfate ($NH_4HSO_4$) were used, and the pellets were sintered at a temperature of 400° C., for 4 hours, in a gas atmosphere consisting of 1% by volume of $NH_3$ and 99% by volume of $N_2$, instead of the air atmosphere. The resultant catalyst and the same composition as that mentioned in Example 3 and the catalytic activity appearing in Table 1.

Also, the valence of vanadium in the resultant catalyst and the $SO_2$ oxidation activity of the resultant catalyst were determined. The resultant catalyst were determined. The results are shown in Table 4 below.

In each of the Examples 8 and 9, procedures identical to those mentioned in Example 3 were carried out, except that the ammonium metavanadate was used in such an amount that the resultant catalyst was composed of the water-insoluble vanadyl sulfate and the barium sulfate, respectively, in an amount appearing in Table 1. The resultant catalyst had the catalytic activity shown in Table 1.

In the Examples 10 and 11, the same procedures as those mentioned in Example 3 were carried out, except that the ammonium sulfate was used in amounts of 13.4 g (Example 10) and 24.4 g (Example 11). The resultant catalysts had the catalytic acitivity shown in Table 1.

Table 1

| Example No. | Composition of catalyst (% by weight) $VOSO_4$ | $BaSO_4$ | Calcining temperature (°C.) | Reduction of $NO_x$ (%) 300°C. | 360°C. |
|---|---|---|---|---|---|
| 1 | 7.5 | 92.5 | 300 | 77 | 89 |
| 2 | 7.5 | 92.5 | 380 | 79 | 89 |
| 3 | 7.5 | 92.5 | 380 | 82 | 93 |
| 4 | 7.5 | 92.5 | 380 | 82 | 92 |
| 5 | 7.5 | 92.5 | 380 | 82 | 93 |
| 6 | 7.5 | 92.5 | 400 | 79 | 90 |
| 7 | 7.5 | 92.5 | 400 | 80 | 91 |
| 8 | 20 | 80 | 380 | 84 | 95 |
| 10 | 7.5 | 92.5 | 380 | 82 | 93 |
| 11 | 7.5 | 92.5 | 380 | 80 | 92 |

Table 1 clearly shows that the catalyst of the present invention containing the vanadium (IV) oxide sulfate (expressed as $VOSO_4$) exhibits a high reduction percentage of $NO_x$ at a relatively low temperature of 300° C.

EXAMPLE 12

The same procedures as those mentioned in Example 3 were carried out, except that the ammonium metavanadate was used in such an amount that the resultant catalyst came to be composed of 30% by weight of vanadium (IV) oxide sulfate and 70% by weight of barium sulfate. The catalytic activity test for the catalyst was carried out at a temperature of 300° C., for 3,500 hours, to determine the durability of the catalyst. The results are shown in Table 2.

Table 2

| | Durability | | | | | | | | |
|---|---|---|---|---|---|---|---|---|---|
| Testing time (hr) | 50 | 100 | 500 | 1,000 | 1,500 | 2,000 | 2,500 | 3,000 | 3,500 |
| Reduction of $NO_x$(%) | 85 | 87 | 88 | 87 | 87 | 88 | 87 | 87 | 87 |

Table 2 shows that the catalyst of the present invention has a very long life.

COMPARATIVE EXAMPLES 1 TO 6

In Comparative Example 1, cobalt sulfate ($CoSO_4$) and calcium sulfate ($CaSO_4$) were respectively mixed in an amount shown in Table 3.

In Comparative Example 2, water-soluble vanadyl sulfate ($VOSO_4$) and calcium sulfate ($CaSO_4$) were respectively mixed in an amount shown in Table 3.

In Comparative Example 3, ferrous sulfate ($FeSO_4$) and calcium sulfate ($CaSO_4$) were respectively mixed in an amount shown in Table 3.

In Comparison Example 4, water-soluble vanadyl sulfate ($VOSO_4$) and barium sulfate ($BaSO_4$) were respectively mixed in an amount shown in Table 3.

In Comparative Example 5, water-soluble vanadyl sulfate ($VOSO_4$) and strontium sulfate ($SrSO_4$) were respectively mixed in an amount shown in Table 3.

In Comparison Example 6, water-soluble vanadyl sulfate ($VOSO_4$) and lead sulfate ($PbSO_4$) were respectiely mixed in an amount shown in Table 3.

In each of the above-mentioned comparative examples, the resultant mixture was kneaded together with a small amount of water, pelletized into a number of pellets each having a diameter of 5 mm and a height of 4 mm and, then, dried at a temperature of 110° C., for 5 hours. No calcining operation was applied to the pellets. The resultant catalysts had the compositions shown in Table 3. In each of Comparative Examples 2 and 4 through 6, the catalyst contained the vanadyl sulfate which is water-soluble. The results of the catalytic activity of each catalyst is shown in Table 3.

Table 3

| Comparitive Example No. | Composition of catalyst (% by weight) | Reduction of $NO_x$ (%) 300° C. | 360° C. |
|---|---|---|---|
| 1 | $CoSO_4$:7.5 $CaSO_4$:92.5 | 67 | 85 |
| 2 | $VOSO_4$:7.5 $CaSO_4$:92.5 | 51 | 75 |
| 3 | $FeSO_4$:7.5 $CaSO_4$:92.5 | 55 | 76 |
| 4 | $VOSO_4$:7.5 $BaSO_4$:92.5 | 56 | 78 |
| 5 | $VOSO_4$:7.5 $SrSO_4$:92.5 | 50 | 72 |
| 6 | $VOSO_4$:7.5 $PbSO_4$:92.5 | 48 | 70 |

Table 3 shows that all of the comparative catalysts have a poorer reduction percentage either at a temperature of 300° C. or 360° C. than that of the present invention. Also, the catalysts of Comparative Examples 2, 4 and 5 were subjected to the test for determining the resistance of the catalysts to water. The catalysts of Comparative Examples 2, 4 and 5 respectively exhibited large values of weight loss of 6.55%, 6.31% and 6.52%.

COMPARATIVE EXAMPLES 7 AND 8

In the Comparative Examples 7 and 8, the same procedures as those mentioned in Example 3 were carried out, except that in place of the barium sulfate, calcium sulfate (Comparative Example 7) and strontium sulfate (Comparative Example 8) were used.

As a result of the catalyst activity test, the catalyst of Comparison Example 7 exhibited a reduction of $NO_x$ of 56% at a temperature of 300° C. and 72% at a temperature of 360° C., and the catalyst of Comparative Example 8 exhibited a reduction of $NO_x$ of 58% at a temperature of 300° C. and 77% at a temperature of 360° C. That is, the catalytic activities of the comparative catalysts were remarkably poorer than that of the present invention.

COMPARATIVE EXAMPLE 9

27.8 g of cobalt sulfate ($CoSO_4 7H_2O$) and 185 g of barium sulfate was mixed and kneaded together with a small amount of water. Then, 19.2 g of ammonium sulfate was added to the mixture and the admixture was dried at a temperature of 110° C. The dried admixture was pelletized to form a number of pellets each having a diameter of 5 mm and a height of 4 mm. The pellets were calcined at a temperature of 350° C. for 5 hours.

The resultant catalyst exhibited, as a result of the catalytic activity test, a reduction of $NO_x$ of 52% at a temperature of 300° C. and 73% at a temperature of 360° C.

COMPARATIVE EXAMPLE 10

40.0 g of ferric nitrate [$Fe(NO_3)_3 9H_2O$], 52.1 g of ammonium sulfate and 185 g of barium sulfate were mixed together and kneaded together with a small amount of water. The mixture was dried at a temperature of 120° C. and pelletized into a number of pellets each having a diameter of 5 mm and a thickness of 4 mm. The pellets were calcined at a temperature of 350° C. for 5 hours. The resultant comparative catalyst exhibited, as a result of the catalytic activity test, reductions of $NO_x$ of 56% at a temperature of 300° C. and 75% at a temperature of 360° C.

COMPARATIVE EXAMPLE 11

Procedures identical to those mentioned in Comparative Example 9 were carried out, except that no ammonium sulfate was used. The resultant comparative catalyst exhibited, as a result of the catalytic activity test, a reduction of $NO_x$ of 53% at a temperature of 300° C. and 72% at a temperature of 360° C.

COMPARATIVE EXAMPLES 12 TO 14

In Comparative Example 12, α-alumina in the form of spheres, each having a size of 5 mm, was immersed in an aqueous solution of 20% by weight of water-soluble vanadyl sulfate ($VOSO_4$) so as to impregnate it with the vanadyl sulfate The impregnated α-alumina spheres were dried at a temperature of 110° C. and, then, calcined at a temperature of 350° C., for 3 hours, in an air atmosphere.

In Comparative Example 13, the same procedures as those mentioned in Comparative Example 12 were carried out, except that γ-alumina in the form of spheres, each having a size of 5 mm, was used in place of the α-alumina.

In Comparison Example 14, the same procedures as those described in Comparative Example 12 were carried out, except that a silica-alumina in the form of pellets, each having a diameter of 5 mm and a thickness of 5 mm, was used in place of the α-alumina.

During each preparation of the comparative catalysts, the color thereof changed from orange to brown. The valence of vanadium in each comparative catalyst was determined. The result is shown in Table 4. With respect to each comparative catalyst, the $SO_2$ oxidation activity was determined. The results are shown in Table 4.

COMPARATIVE EXAMPLE 15

20 g of commercial water-soluble vanadyl sulfate ($VOSO_4 3H_2O$) and 185 g of barium sulfate ($BaSO_4$) were mixed together and kneaded together with a small amount of water. The mixture was dried at a temperature of 110° C. and pelletized to form a number of pellets, each having a diameter of 5 mm and a thickness of 4 mm. The pellets were calcined at a temperature of 380° C., for 3 hours, in an air atmosphere. The valence of vanadium in the resultant catayst and $SO_2$ oxidation activity of the catalyst were determined. The results are shown in Table 4.

Table 4

| Catalyst | $SO_2$ oxidation activity (%) | | | Valence of vanadium in catalyst |
|---|---|---|---|---|
| | 250° C. | 300° C. | 350° C. | $V^{+5}/V^{+4}$ (by weight) |
| Comparative Example 12 | 10.1 | 11.6 | 19.8 | 94/6 |
| 13 | 10.4 | 12.6 | 22.3 | 96/4 |
| 14 | 6.4 | 7.3 | 12.6 | 91/9 |
| 15 | 4.5 | 6.8 | 11.9 | 87/13 |
| Example 1 | 0 | 0 | 1.9 | 0/100 |
| 2 | 0 | 0 | 2.1 | 1.5/98.5 |
| 3 | 0 | 0 | 1.7 | 0.5/99.5 |
| 7 | 0 | 0.1 | 1.8 | 0.8/99.2 |

Table 4 clearly illustrates that the entire amount or substantially the entire amount of vanadium in the catalyst of the present invention has a valence of 4 and the catalyst of the present invention has low or substantially no catalytic activity for oxidizing $SO_2$. However, in the comparative catalysts, almost all of the vanadium atoms have a valence of 5. Also, the comparative catalysts exhibited a relatively high catalytic activity for oxidizing $SO_2$.

Furthermore, the above-mentioned examples and comparative examples indicate the fact that the catalysts of the present invention have an excellent resistance to water, whereas the comparative catalysts exhibit a relatively large weight loss when immersed in water. This fact illustrates that the vanadyl sulfate in the catalyst of the present invention is significantly insoluble in water and, therefore, is definitely distinguished from the conventional water-soluble vanadyl sulfate.

What we claim is:

1. A process for producing a catalyst usable for reducing nitrogen oxides with ammonia, said catalyst being water-insoluble and having peaks at $940^{cm-1}$ and $510^{cm-1}$ in an infrared absorption spectrum, comprising:

preparing a mixture containing from about 65 to 99% barium sulfate and from about 1 to 35% of water-insoluble vanadium (IV) oxide sulfate which has been prepared by boiling a mixture of a vanadium oxide and concentrated sulfuric acid, said percentages based on the weight of the solids in the mixture;

drying the resultant mixture, and;

calcining the dried mixture at a temperature of from 200° to 450° C. in an oxygen-containing atmosphere.

2. A process as claimed in claim 1, wherein said oxygen-containing atmosphere contains a gas selected from the group consisting of sulfurous acid gas, ammonia gas and a mixture thereof.

3. A process as claimed in claim 1, wherein said calcining operation is carried out for 1 to 24 hours.

4. A process for producing a catalyst useful for reducing nitrogen oxides with ammonia, said catalyst comprising a mixture containing about 65 to 99% by weight barium sulfate and about 1 to 35% by weight of vanadium (IV) oxide sulfate which is water-insoluble and has absorption peaks at $940^{cm-1}$ and $510^{cm-1}$ in the infrared spectrum, said process comprising:

(a) forming an aqueous mixture of a vanadyl compound, corresponding to about 1 to 35% by weight of the solids of vanadium (IV) oxide sulfate, in which vanadium has a valence less than 5 and which has been prepared by dissolving a vanadium compound in an aqueous solution of a reducing substance, sulfuric acid or an ammonium salt of a sulphur-oxygen acid and from about 65 to 99% by weight of the solids of barium sulfate;

(b) drying the resultant mixture; and (c) calcining the dried mixture at a temperature of from 200° to 450° C. in an oxygen-containing atmosphere.

5. A process as claimed in claim 4, wherein said drying operation is carried out at a temperature of from 90° to 150° C.

6. A process as claimed in claim 4, wherein said vanadium compound to be reduced is vanadium pentoxide or ammonium metavanadate.

7. A process as claimed in claim 4, wherein said reducing substance is oxalic acid.

8. A process as claimed in claim 4, wherein said ammonium salt of a sulphur-oxygen acid is selected from the group consisting of ammonium hydrogen sulfate, ammonium sulfite, ammonium sulfate and ammonium persulfate.

9. A process as claimed in claim 4, wherein said oxygen-containing atmosphere contains a gas selected from the group consisting of ammonia gas and a mixture of ammonia gas with sulfurous acid gas.

10. A process as claimed in claim 4, wherein said gas mixture has a ratio in atoms of sulphur to vanadium of from 1 to 2.

11. A process as claimed in claim 10, wherein said mixture is prepared by impregnating a shaped barium sulfate material with an aqueous solution of said water-soluble vanadyl sulfate.

12. A process for producing a catalyst useful for reducing nitrogen oxides with ammonia, said catalyst comprising a mixture containing from 65 to 99% by weight of barium sulfate and from 1 to 35% by weight of vanadium (IV) oxide sulfate which is water-insoluble and has absorption peaks in the infrared spectrum at $940 cm^{-1}$ and $510 cm^{-1}$, which comprises:

(a) preparing an aqueous mixture containing from about 65 to 99% by weight of the solids of barium sulfate and an amount of water-soluble vanadyl sulfate sufficient to provide from 1 to 35% by weight of the catalyst of vanadium (IV) oxide sulfate;

(b) drying the resultant mixture, and (c) calcining the dried mixture at a temperature of from 250° to 450° C. in an atmosphere containing sulfurous acid gas and ammonia gas to obtain said catalyst product.

13. A catalyst for reducing nitrogen oxides with ammonia, which comprises a uniform mixture of 65 to 99% of barium sulfate and 1 to 35% of vanadyl sulfate, based on the entire weight of said catalyst, said vanadyl sulfate being vanadium (IV) oxide sulfate which is water-insoluble and has peaks at $940 cm^{-1}$ and $510 cm^{-1}$ in an infrared absorption spectrum.

14. A catalyst as claimed in claim 12, wherein the amounts of said barium sulfate and said vanadyl sulfate are 70 to 95% and 5 to 30% based on the entire weight of said catalyst, respectively.

* * * * *